UNITED STATES PATENT OFFICE.

THEODORE H. RIETHMÜLLER, OF PITTSBURG, PENNSYLVANIA.

COMPOSITION FOR CURING MEATS.

SPECIFICATION forming part of Letters Patent No. 329,774, dated November 3, 1885.

Application filed March 13, 1884. Serial No. 124,069. (No specimens.)

*To all whom it may concern:*

Be it known that I, THEODORE H. RIETHMÜLLER, of Pittsburg, in the county of Allegheny and State of Pennsylvania, have invented a new and useful Improvement in Compositions for Curing Meat; and I do hereby declare the following to be a full, clear, and exact description thereof.

In the method of curing meat now usually employed the meat, after having been cut, is placed in a pickle composed mainly of saltpeter and water, and is allowed to remain there until it is thoroughly pickled, from sixty to sixty-five days being the time required.

My invention consists in an improved compound for forming the pickle, by the use of which the meat is more thoroughly pickled than in the use of the common pickle now generally employed, and at the same time less than thirty or thirty-five days' time is required in the pickling operation. This compound is composed of the following ingredients, in about the proportions stated: soda-ash, four ounces; potash, five ounces; sal-soda, two ounces; juniper-berries, four ounces; Banner baking-powder, one ounce; cream of tartar, one and one-half ounce; pearlash, three ounces; caustic soda, two ounces.

Banner baking-powder is an article of trade, and is composed of the following ingredients: tartaric acid, bicarbonate of soda, and potato farina. These ingredients are first mixed together, and then stirred into about a gallon of water. The pickle so formed may be used in the usual manner, the amount of ingredients being increased according to the amount of pickle desired.

Although I have mentioned certain proportions of the several ingredients, I do not desire to limit myself thereto, as they may be varied according to the quality or condition of the meat.

The advantages of my invention are that by the use of the foregoing compound the marrow is prevented from becoming sour, the meat is thoroughly cured, and less time is occupied in the pickling operation than heretofore.

Having thus described my invention, what I claim, and desire to secure by Letters Patent, is—

A compound for curing meat, consisting of soda-ash, potash, sal-soda, juniper-berries, tartaric acid, bicarbonate of soda, potato farina, cream of tartar, pearlash, and caustic soda, substantially as described.

In testimony whereof I have hereunto set my hand.

THEODORE H. RIETHMÜLLER.

Witnesses:
 THOMAS W. BAKEWELL,
 JAMES H. PORTE.